(12) United States Patent
Kimoto

(10) Patent No.: US 8,888,901 B2
(45) Date of Patent: Nov. 18, 2014

(54) FUEL VAPOR TREATING APPARATUS

(71) Applicant: Aisan Kogyo Kabushiki Kaisha, Obu (JP)

(72) Inventor: Junya Kimoto, Obu (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 89 days.

(21) Appl. No.: 13/857,710

(22) Filed: Apr. 5, 2013

(65) Prior Publication Data

US 2013/0269532 A1 Oct. 17, 2013

(30) Foreign Application Priority Data

Apr. 12, 2012 (JP) ................. 2012-090772

(51) Int. Cl.
*B01D 53/04* (2006.01)
*F02M 25/08* (2006.01)
*B60K 15/035* (2006.01)

(52) U.S. Cl.
CPC ...... *B01D 53/0446* (2013.01); *B60K 15/03504* (2013.01)
USPC ............................................ 96/108; 123/519

(58) Field of Classification Search
USPC ............... 96/108; 95/146; 123/518–521
See application file for complete search history.

(56) References Cited

U.S. PATENT DOCUMENTS

| 4,714,172 | A | * | 12/1987 | Morris | ........................ | 220/86.2 |
| 4,762,156 | A | * | 8/1988 | Rich | .............................. | 141/46 |
| 5,462,100 | A | * | 10/1995 | Covert et al. | .................... | 141/59 |
| 5,579,742 | A | * | 12/1996 | Yamazaki et al. | ............. | 123/520 |
| 6,003,539 | A |   | 12/1999 | Yoshihara | | |
| 6,047,687 | A | * | 4/2000 | Ishikawa et al. | ............... | 123/518 |
| 6,405,718 | B1 | * | 6/2002 | Yoshioka et al. | ............. | 123/520 |
| 7,509,949 | B2 |   | 3/2009 | Muto et al. | | |
| 8,474,439 | B2 | * | 7/2013 | Makino et al. | ................. | 123/516 |
| 2012/0118159 | A1 | * | 5/2012 | Kitamura et al. | ............... | 96/152 |

FOREIGN PATENT DOCUMENTS

| JP | 1999208293 A | 8/1999 |
| JP | 2004251187 A | 9/2004 |

* cited by examiner

*Primary Examiner* — Frank Lawrence
(74) *Attorney, Agent, or Firm* — Conley Rose, P.C.

(57) ABSTRACT

A fuel vapor treating apparatus includes a fuel tank having an inlet pipe and being configured to preserve liquid fuel therein, an adsorbent canister filled with an adsorbent capable of adsorbing fuel vapor, a fuel vapor path connecting the fuel tank to the adsorbent canister, a diaphragm valve having a back pressure chamber and being configured to open and close the fuel vapor path, a circulation path connecting the fuel tank to the inlet pipe for circulating fuel vapor from the fuel tank to the inlet pipe during refueling and being configured to be blocked when the fuel tank is filled up, and a negative pressure generator connected to the circulation path and the back pressure chamber and configured to generate negative pressure by using a stream of the fuel vapor in the circulation path in order to cause the negative pressure to act on the back pressure chamber of the diaphragm valve.

4 Claims, 4 Drawing Sheets

FUEL VAPOR TREATING APPARATUS

This application claims priority to Japanese patent application Ser. No. 2012-090772, the contents of which are incorporated herein by reference.

BACKGROUND OF THE INVENTION

This disclosure relates to a fuel vapor treating apparatus generally mounted on a vehicle such as an automobile.

A conventional fuel vapor treating apparatus has an adsorbent canister capable of adsorbing and desorbing fuel vapor from a fuel tank, a fuel vapor path, connecting the adsorbent canister to the fuel tank, and a diaphragm valve configured to close and open the fuel vapor path (for example, Japanese Laid-Open Patent Publication No. 11-208293).

In a conventional fuel vapor treating apparatus, inner pressure of the fuel tank acts on a pressure control chamber in order to open the diaphragm valve during refueling. Then, gas having a content of fuel vapor flows from the fuel tank into the adsorbent canister. In such a configuration, it is difficult to achieve improvements in both (1) ease of refueling and (2) sealing capability when the diaphragm is closed. That is, the ease of refueling can be improved by decreasing opening pressure in the diaphragm valve. However, this configuration lowers the sealing ability of the closed diaphragm valve. Therefore, inner gas in the fuel tank leaks into the adsorbent canister after refueling using a gas pump. This results in a rather low liquid fuel, level in the inlet pipe of the fuel tank. In this situation, an operator can additionally add fuel by further operation of the gas fuel pump, however, there is a possibility that excessive refueling may occur. In contrast, sealing ability can be improved by increasing the opening pressure of the diaphragm valve. This, however, increases the pressure level during refueling and can thereby result in increased refueling difficulty. Accordingly, there has been a need for an improved fuel vapor treating apparatus.

BRIEF SUMMARY OF THE INVENTION

In a first aspect of this disclosure, a fuel vapor treating apparatus includes a fuel tank having an inlet pipe and being configured to preserve liquid fuel therein, an adsorbent canister filled with an adsorbent capable of adsorbing fuel vapor, a fuel vapor path connecting the fuel tank to the adsorbent canister, a diaphragm valve having a back pressure chamber and being configured to open and close the fuel vapor path, a circulation path connecting the fuel tank to the inlet pipe for circulating fuel vapor from the fuel tank to the inlet pipe during refueling and being configured to be blocked when the fuel tank is filled up, and a negative pressure generator connected to the circulation path and the back pressure chamber and configured to generate negative pressure by using a stream of the fuel vapor in the circulation path in order to cause the negative pressure to act on the back pressure chamber of the diaphragm valve.

According to this aspect, during refueling, a stream of fuel vapor from the fuel tank flows into the circulation path, and the negative pressure generator generates negative pressure by using the stream and applies the negative pressure on the back pressure chamber of the diaphragm valve. Thus, the diaphragm valve is opened by a combination of the inner pressure of the fuel tank and the negative pressure. As a result, fuel vapor is discharged from the fuel vapor into the adsorbent canister through, the fuel vapor path, so that the fuel vapor is adsorbed in the adsorbent canister. When the fuel tank is filled up, the circulation path is blocked. Thus, the stream of the fuel vapor in the circulation path is stopped, and the negative pressure generator stops generating negative pressure, so that the diaphragm valve is closed. Therefore, because the diaphragm valve is configured to be opened by the combination of the inner pressure of the fuel tank and the negative pressure, pressure loss can be decreased and ease of refueling can be improved compared with a conventional, apparatus where a diaphragm valve is opened by only infernal pressure of a fuel tank. In addition, sealing capability can be improved by increasing opening pressure of the diaphragm valve.

DETAILED DESCRIPTION OF THE INVENTION

Each of the additional features and teachings disclosed above and below may be utilized separately or in conjunction with other features and teachings to provide improved fuel vapor treating apparatuses. Representative examples of the present invention, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover various features of the representative examples and the dependent claims may be combined in ways that are not specifically enumerated in order to provide additional useful embodiments of the present teachings.

Figure 1:
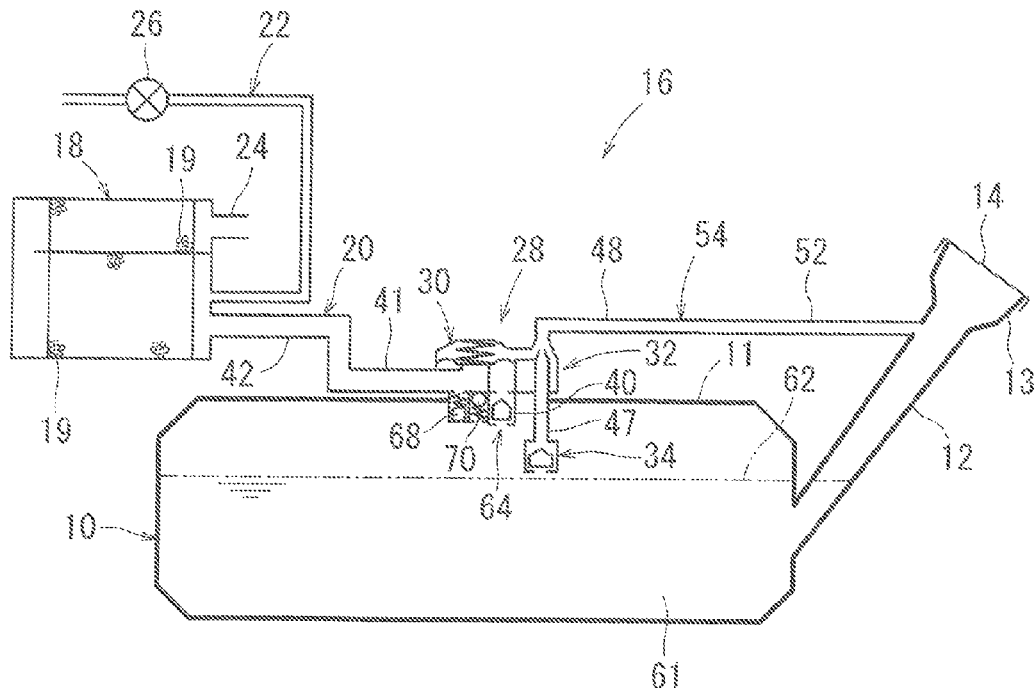
FIG. 1 is a schematic view of a fuel vapor treating apparatus according to a first embodiment.

A first embodiment will be described. In this embodiment, a fuel vapor treating apparatus mounted on a vehicle such as an automobile is exemplified. FIG. 1 is a schematic view showing the fuel vapor treating apparatus. As shown in FIG. 1, a fuel tank 10 of a vehicle has an inlet pipe 12. The inlet pipe 12 has an upper open end, i.e., fill opening 13 where a cap 14 for closing the fill opening 13 is removably attached.

A fuel vapor treating apparatus 16 for recovering fuel vapor in the fuel tank 10 has an adsorbent canister 18. The adsorbent canister 18 is connected to the fuel tank 10 via a fuel vapor path 20 such that the adsorbent canister 18 directly communicates with a gaseous layer in the feel tank 10. The adsorbent canister 18 is connected to an intake path of an internal combustion engine (not shown) via a purge path 22. The adsorbent canister 18 opens to the atmosphere via an air communication port 24. The purge path 22 is provided with a purge control valve 26 configured to open and close the purge path 22. While the internal combustion engine is running, an electric control unit (ECU, not shown) controls the purge control valve 26 in order to carry out a purge operation. The adsorbent canister 18 is filled with an adsorbent 19 such as activated carbon capable of adsorbing and desorbing fuel vapor.

Under normal conditions (with the exception of refueling), e.g., during parking, gas which contains fuel vapor in the fuel tank 10 is discharged into the adsorbent canister 18 via the fuel vapor path 20. The adsorbent canister 18, in particular the adsorbent 19, adsorbs the fuel vapor in the gas. During the purge operation, (while the internal combustion engine is running), negative pressure generated in the internal combustion engine acts on the adsorbent canister 18 when the ECU opens the purge control valve 26. Resultantly, atmospheric air flows into the adsorbent canister 18 via the air communication port 24. Thus, the fuel vapor is desorbed from the adsorbent canister 18 and in particular the adsorbent 19. Mixed gas containing the air and the desorbed fuel vapor is then introduced into the intake path of the internal combustion engine via the purge path 22.

Figure 2:
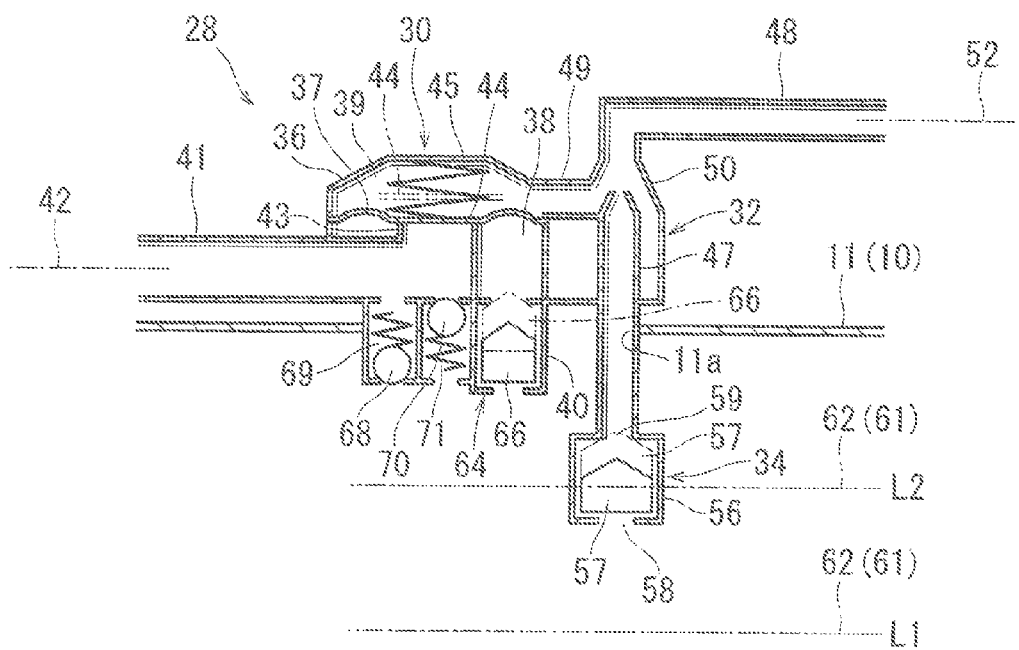
FIG. 2 is a cross-sectional view showing an excessive refueling prevention device in the first embodiment.

An upper wall 11 of the fuel tank 10 is provided with an excessive refueling prevention device 28. FIG. 2 is a cross-sectional view of the excessive refueling prevention device 28. As shown in FIG. 2, the excessive refueling prevention device 28 has a diaphragm valve 30 as a main part, an ejector 32 and a fill-up regulation valve 34. The diaphragm valve 30 has a valve case 36 and a diaphragm 37 housed in the valve case 36. The valve case 36 is placed on the upper wail 11 of the fuel tank 10 and blocks an opening 11a formed at the upper wall 11. The diaphragm 37 is made from a rubber-like elastic material having flexibility. The diaphragm 37 divides an inner space of the valve case 36 into two chambers, i.e., a lower pressure control chamber 38 and an upper back pressure chamber 39. The pressure control, chamber 38 communicates with a fuel vapor introduction pipe 40 and a fuel vapor discharge pipe 41. The fuel vapor introduction pipe 40 extends through the opening 11a of the upper wall 10 and into the fuel tank 10 in order to communicate with an inner space of the fuel tank 10. The fuel vapor discharge pipe 41 is connected to the adsorbent canister 18 via a fuel vapor pipe 42 (FIG. 1). Here, the fuel vapor path 20 is composed of the fuel vapor introduction pipe 40, the fuel vapor discharge pipe 41 and the fuel vapor pipe 42. The fuel vapor introduction pipe 40 and the fuel vapor discharge pipe 41 are preferably integrally connected to the valve case 36.

The diaphragm 37 has at a center thereof a valve portion 44 configured to close an open end of the fuel vapor discharge pipe 41, i.e., a valve seat 43. In the back pressure chamber 39, a spring member 45 such as a coil spring is located, between the valve case 36 and the diaphragm 37. The spring member 45 biases the valve portion 44 of the diaphragm 37 in a direction for closing the valve seat 43, i.e., a direction for contacting the valve portion 44 with the valve seat 43.

The ejector 32 has a nozzle pipe 47, a discharge pipe 48 and a suction pipe 49. An ripper end of the nozzle pipe 47 and a lower end of the discharge pipe 48 form a double pipe structure such that the lower end of the discharge pipe 48 is positioned outside of the upper end of the nozzle pipe 47. The discharge pipe 48 has a diffuser portion 50 near the upper open end of the nozzle pipe 47, the nozzle pipe 47 extends through the opening 11a of the upper wall 11 into the fuel tank 10 in order to communicate with the inner space of the fuel tank 10. The diffuser portion 50 of the discharge pipe 48 communicates with the back pressure chamber 39 of the diaphragm valve 30 via the suction pipe 49. The discharge pipe 48 is connected to the middle of the inlet pipe 12 of the fuel tank 10 via a breather pipe 52 (see FIG. 1). The nozzle pipe 47, the discharge pipe 48 and the breather pipe 52 form a breather path 54. Here, the breather path 54 corresponds to "circulation path" herein. The nozzle pipe 47, the discharge pipe 48 and the suction pipe 49 of the ejector 32 are integrated with, the valve ease 36.

The ejector 32 generates negative pressure in the suction pipe 49 by using a stream in the breather path 54 during refueling, that is, a stream of fuel vapor flowing from the inner space of the fuel tank 10 through the nozzle pipe 47, the discharge pipe 48 and the breather pipe 52 to the inlet pipe 12. The negative pressure acts on the back pressure chamber 39 of the diaphragm valve 30. Here, the ejector 32 corresponds to "negative pressure generator" herein.

The fill-up regulation valve 34 has a valve housing 56 integrated with a lower open end of the nozzle pipe 47 of the ejector 32, and a float valve 57 housed in the valve housing 56. The valve housing 56 has at a bottom thereof a bottom opening 58 for communicating with the inner space of the fuel tank 10. At an upper open end of the valve housing 56, i.e., at the lower open end of the nozzle pipe 47, a valve opening 59 is formed such that the float valve 47 can close the valve opening 59.

When a liquid level 62 of liquid fuel 61 in the fuel tank 10 (see FIG. 1) is below the fill-up regulation valve 34 (see line L1 in FIG. 2), the float valve 57 is in a bottom section (lower limit position) of the valve housing 56, so that the valve opening 59 is open. In this situation, because the nozzle pipe 47 communicates with the inner space of the fuel tank 10, fuel vapor can flow from the fuel tank 10 into the nozzle pipe 47 of the ejector 32. When the liquid level 62 rises to the position of the fill-up regulation valve 34 (see line L2 in FIG. 2), i.e., the liquid fuel flows into the valve housing 56, the float valve 57 moves upward in the valve housing 56 due to buoyant force generated by the liquid fuel 61, so that the float valve 57 closes the valve opening 59 (see two-dot chain line 57 in FIG. 2). Thus, communication between the nozzle pipe 47 and the interior of the fuel tank 10 is blocked.

The excessive refueling prevention device 28 has a cutoff valve 64. The cutoff valve 64 has a valve body 66 housed in a valve housing formed at a lower end of the fuel vapor introduction pipe 40. The lower end of the fuel vapor introduction pipe 40 also serves as an inlet for the diaphragm valve 30 with regards to the fuel vapor. The onto if valve 64 is open under normal conditions. Should the vehicle overturn, the cutoff valve 64 is closed by displacement of the valve body 66 (see two-dot chain line 66 in FIG. 2) in order to prevent the liquid fuel in the fuel tank 10 from flowing out of the fuel tank 10. The cutoff valve 64 is positioned above the fill-up regulation valve 34. Thus, when the fuel tank 10 is filled up, the liquid level 62 of dm liquid fuel 61 does not reach the cutoff valve 64.

The excessive refueling prevention device 28 has a positive pressure relief valve 68 and a negative pressure relief valve 70. The valve case 36 has a positive pressure port 69 and a negative pressure port 71 each allows for communication between the fuel vapor discharge pipe 41 and the interior of the fuel tank 10. The positive pressure port 69 houses the positive pressure relief valve 68 therein. The positive pressure relief valve 68 is configured as a check valve to open under normal conditions and to close when the inner pressure of the fuel tank 10 is above a predetermined value. The negative pressure port 71 houses the negative pressure relief valve 70 therein. The negative pressure relief valve 70 is configured as a check valve to close under normal conditions and to open when the inner pressure of the adsorbent canister 18 is above a predetermined value.

Figure 3:
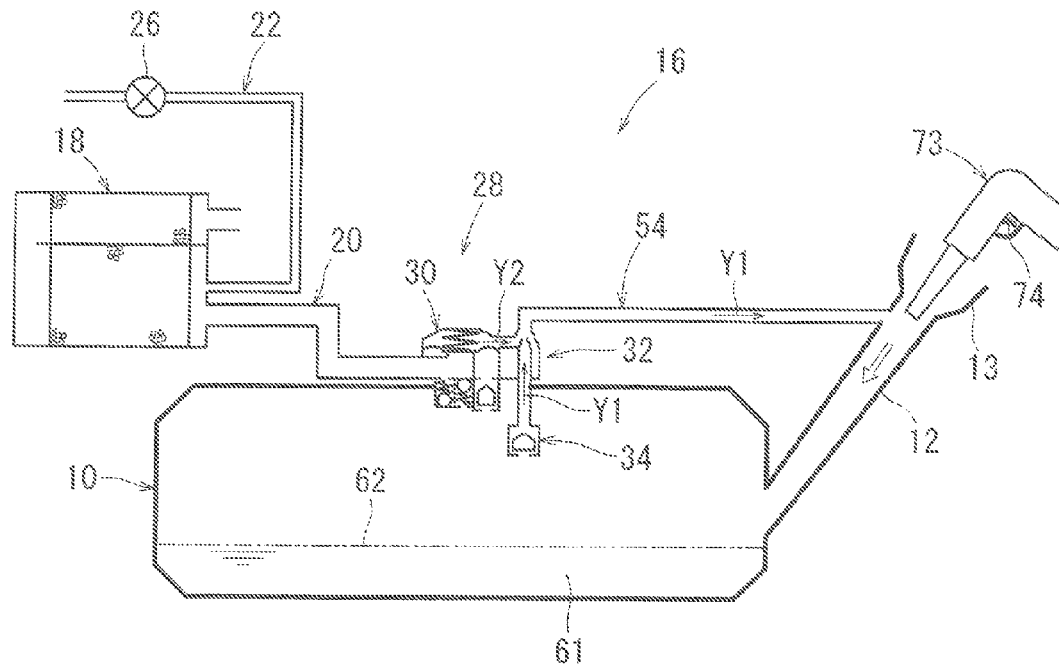
FIG. 3 is a schematic view showing the fuel vapor treating apparatus at the start of refueling.
Figure 4:
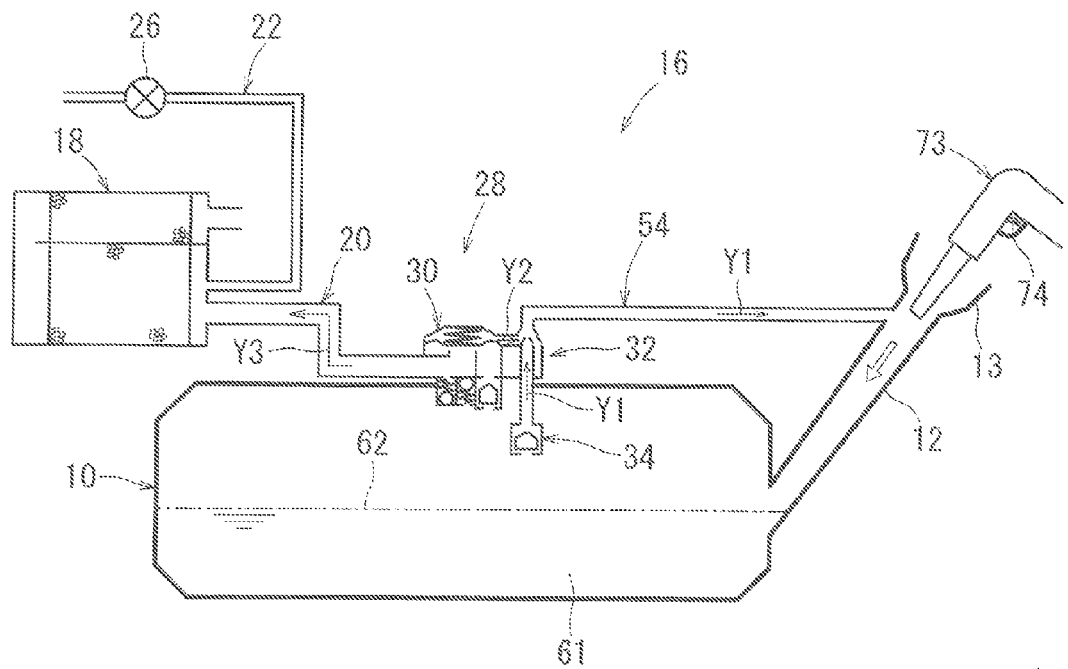
FIG. 4 is a schematic view showing the fuel vapor treating apparatus during refueling.
Figure 5:
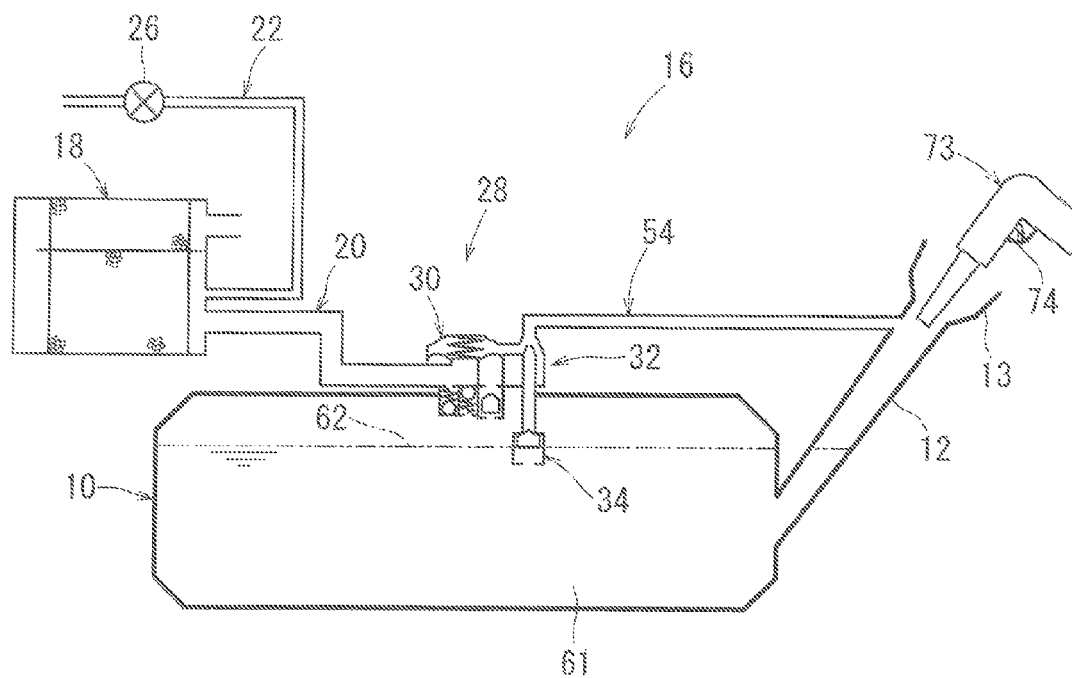
FIG. 5 is a schematic view showing the fuel vapor treating apparatus at the completion of refueling.

Next, a behavior of the fuel vapor treating apparatus 16 will be described. FIG. 3 is a schematic view showing the fuel vapor treating apparatus at the start of refueling. FIG. 4 is a schematic view showing the fuel vapor treating apparatus during refueling. FIG. 5 is a schematic view showing the fuel vapor treating apparatus at the completion of refueling. Here, in cases other than refueling, the diaphragm valve 30 is closed (see FIG. 2).

As shown in FIG. 3, before refueling, the cap 14 is removed in order to open the fill opening 13 of the inlet pipe 12 of the fuel tank 10. Then, in a state where a gas pump 73 is inserted into the fill opening 13, an operator operates a lever 74 of the gas pump 73 in order to start refueling (see white arrow in FIG. 3). When starting refueling, a stream (circulation stream) of fuel vapor from the fuel tank 10 flows into the breather path 54 (arrow Y1 in FIG. 3). The ejector 32 generates negative pressure by using the stream such that the negative pressure acts on the back pressure chamber 39 (arrow Y2 in FIG. 3). Thus, combination of the inner pressure of the fuel tank 10 and the negative pressure opens the diaphragm, valve 30 (two-dot chain line 44 in FIG. 2).

As shown in FIG. 4, when the diaphragm valve 30 is opened, the fuel vapor in the fuel tank 10 is discharged into the adsorbent canister 18 via the fuel vapor path 20 (arrow Y3 in FIG. 4), and the fuel vapor is adsorbed in the adsorbent canister 18. Thus, it is able to fulfill an ORVR (Onboard Refueling Vapor Recovery) function capable of trapping a large amount of fuel vapor vaporized in the fuel tank 10 during refueling. Further, the diaphragm valve 30 is open as long as the ejector 32 generates the negative pressure (arrow Y2 in FIG. 4) by using the stream in die breather path 54 (arrow Y1 in FIG. 4).

As shown in FIG. 5, when the fuel tank 10 is filled up, the liquid level 62 of the liquid fuel 61 reaches the fill-up regulation valve 34, so that the fill-up regulation valve 34 is closed in order to close the breather path 54. Thus, because the stream in the breather path 54 is blocked, the ejector 32 does not generate negative pressure. Therefore, the diaphragm valve 30 is closed. Furthermore, an automatic stop mechanism of the gas pump 73 automatically stops refueling. Then, refueling is completed by removing the gas pump 73 from the fill opening 13 of the inlet pipe 12 of the fuel tank 10 and attaching the cap 14 to the fill opening 13 (see FIG. 1).

In the fuel vapor treating apparatus 16, the diaphragm valve 30 is opened by a combination of the inner pressure of the fuel tank 10 and the negative pressure. Thus, pressure loss during refueling can be decreased and the ease of refueling can be improved compared with a conventional apparatus where a diaphragm valve is opened by only inner pressure of a fuel tank. In addition, the sealing ability can be unproved by increasing the opening pressure of the diaphragm valve 30. When the sealing ability is improved, it is able to prevent gas from flowing from the fuel tank 10 into the adsorbent canister 18 after automatic stopping of the gas pump 73. Therefore, because the liquid level 62 of the liquid fuel 61 in the inlet pipe 12 does not come down, it is not able to additionally refuel, resulting in the prevention of excessive refueling.

Even if negative pressure acts on the fuel vapor path 20 during the purge operation, the diaphragm valve 30 remains in a closed state in order to prevent the negative pressure from acting on the interior of the fuel tank 10. Accordingly, a large-size purge control valve 26 can be used. In addition, cost for the adsorbent canister 18 can be decreased and the adsorbent canister 18 can be downsized by using crushed activated carbon as the adsorbent 19 of the adsorbent canister 18 and by increasing art L/D ratio where L is a path, length of an adsorption chamber of the adsorbent canister 18 and D is a path diameter of the adsorption chamber. Even if the positive pressure relief valve 68 is opened by the negative pressure acting on the fuel vapor path 20 during the purge operation, the positive pressure port 69 can reduce the likelihood of the positive pressure relief valve 68 opening. This is because a path area in the positive pressure port 69 is small such that the positive pressure port 69 decreases intensity of the negative pressure. During parking, the diaphragm valve 30 opens when the inner pressure of the fuel tank 10 is above a predetermined value. In this way, the diaphragm valve 30 serves as tank pressure control valve discharging the fuel vapor from the fuel tank 10 into the adsorbent canister 18. This is effective for suppression of the generation of fuel vapor in the fuel tank 10.

When the fuel tank 10 is filled up, the closed fill-up regulation valve 34 securely blocks the breather path 54. Thus, it is able to prevent the liquid fuel 62 from spontaneously flowing into the breather path 54. As a result, excessive refueling can be prevented. In addition, the fill-up regulation valve 34 can be reduced in size by making path area of the breather path 54, in particular the valve opening 59, smaller than that of the fuel vapor path 20 compared with an apparatus where the fuel vapor path 20 is provided with the fill-up regulation valve.

The cutoff valve 64 which is opened and closed by buoyant force generated by the liquid fuel is provided at an inlet of the diaphragm valve 30 for the fuel vapor. Due to this configuration, it is able to integrate the cutoff valve 64 into the diaphragm valve 30. This is effective for reducing the size of the excessive refueling prevention device 28.

Figure 6:
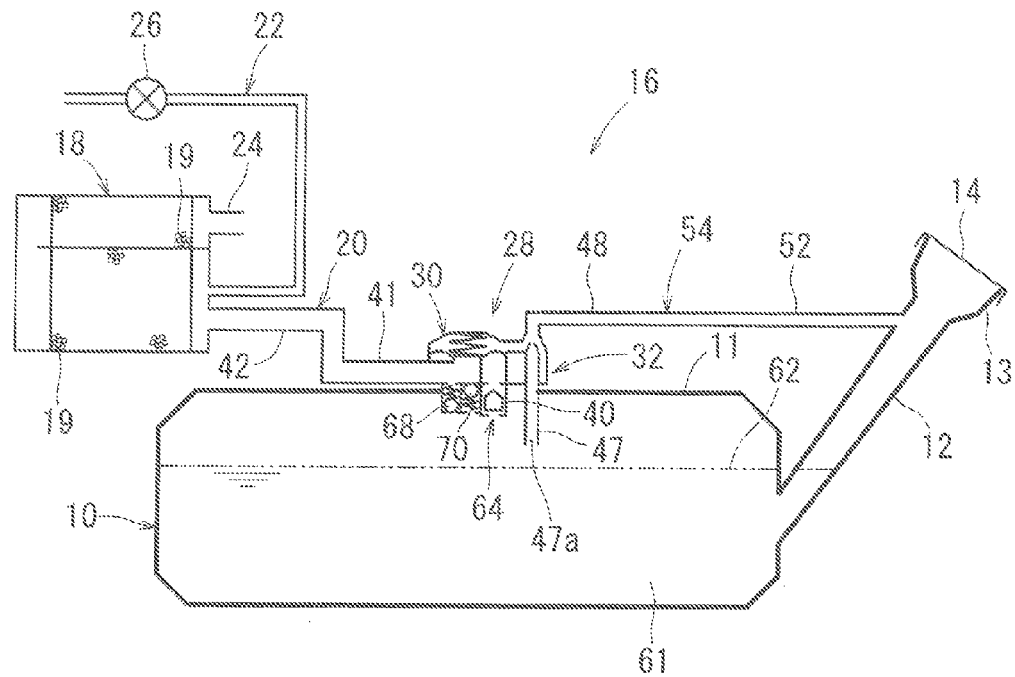
FIG. 6 is a schematic view of a fuel vapor treating apparatus according to a second embodiment.
Figure 7:
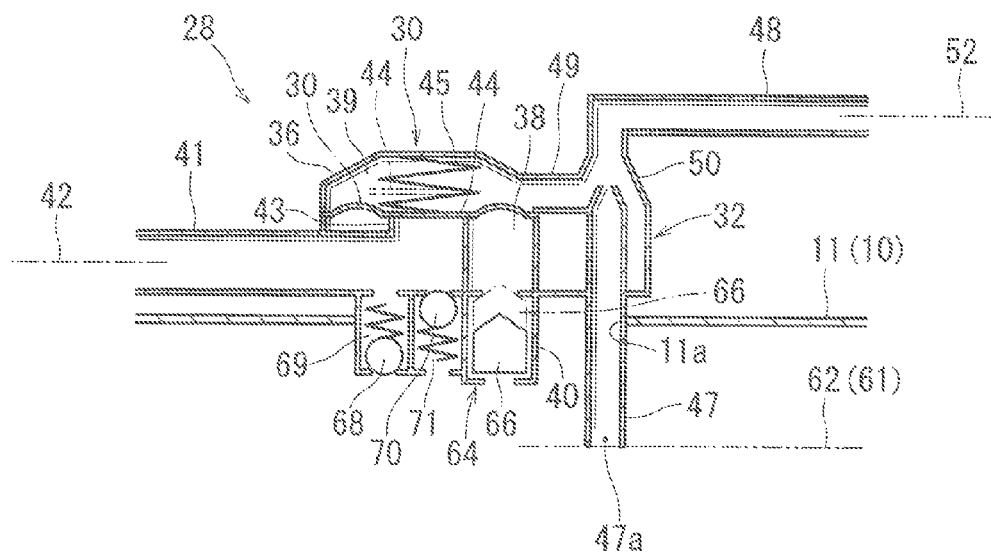
FIG. 7 is a cross-sectional view of an excessive refueling prevention device in the second embodiment.

A second embodiment will be described. This embodiment corresponds to the first embodiment with some modifications. So, such modifications will be described, and the same configurations will not be described. FIG. 6 is a schematic view showing the fuel vapor treating apparatus. FIG. 7 is a cross-sectional view showing the excessive refueling prevention device. As shown in FIG. 6, a lower opening 47a of the nozzle pipe 47 of the ejector 32 is open to the interior of the fuel tank 10 instead of being provided with the fill-up regulation valve. Thus, when the fuel tank 10 is filled up, the liquid level 62 of the liquid fuel 61 closes the lower opening 47a of the nozzle pipe 47, thereby blocking the breather path 54. According to this embodiment, cost can be reduced by omitting the fill-up regulation valve.

The present invention is not limited to the above-described embodiments and can include further modifications without departing from the scope and the sprit of the present invention. For example, although the diaphragm valve 30, the ejector 32, the fill-up regulation valve 34, the cutoff valve 64, the positive pressure relief valve 68 and the negative pressure relief valve 70 are integrated into a module in the first embodiment, they can be provided independently, and some of them can be formed in a module. In addition, at least one of the cutoff valve 64, the positive pressure relief valve 68 and the negative pressure relief valve 70 of the excessive refueling prevention device 28 may be emitted.

The invention claimed is:
1. A fuel vapor treating apparatus comprising:
   a fuel tank having an inlet pipe and being configured to preserve liquid fuel therein;
   an adsorbent canister filled with an adsorbent capable of adsorbing fuel vapor;
   a fuel vapor path connecting the fuel tank to the adsorbent canister, a diaphragm valve having a back pressure chamber and being configured to open and close the fuel vapor path;

a circulation path connecting the fuel tank to the inlet pipe for circulating fuel vapor from the fuel tank to the inlet pipe during refueling and being configured to be blocked when the fuel tank is filled up; and a negative pressure generator connected to the circulation path and the back pressure chamber and configured to generate negative pressure by using a stream of the fuel vapor in the circulation path in order to cause the negative pressure to act on the back pressure chamber of the diaphragm valve.

2. The fuel vapor treating apparatus according to claim 1, wherein the circulation path is provided with a fill-up regulation valve configured to be opened and closed by buoyant force generated by liquid fuel in the fuel tank.

3. The fuel vapor treating apparatus according to claim 1, wherein the diaphragm valve has an inlet for the fuel vapor, and the inlet is provided with a cutoff valve configured to be opened and closed by buoyant force generated by liquid fuel in the fuel tank.

4. The fuel vapor treating apparatus according to claim 1, wherein the circulation path has an nozzle pipe extending into the fuel tank such that when the fuel tank is filled up, an end of the nozzle pipe sinks in the liquid fuel.

\* \* \* \* \*